Figure 1:
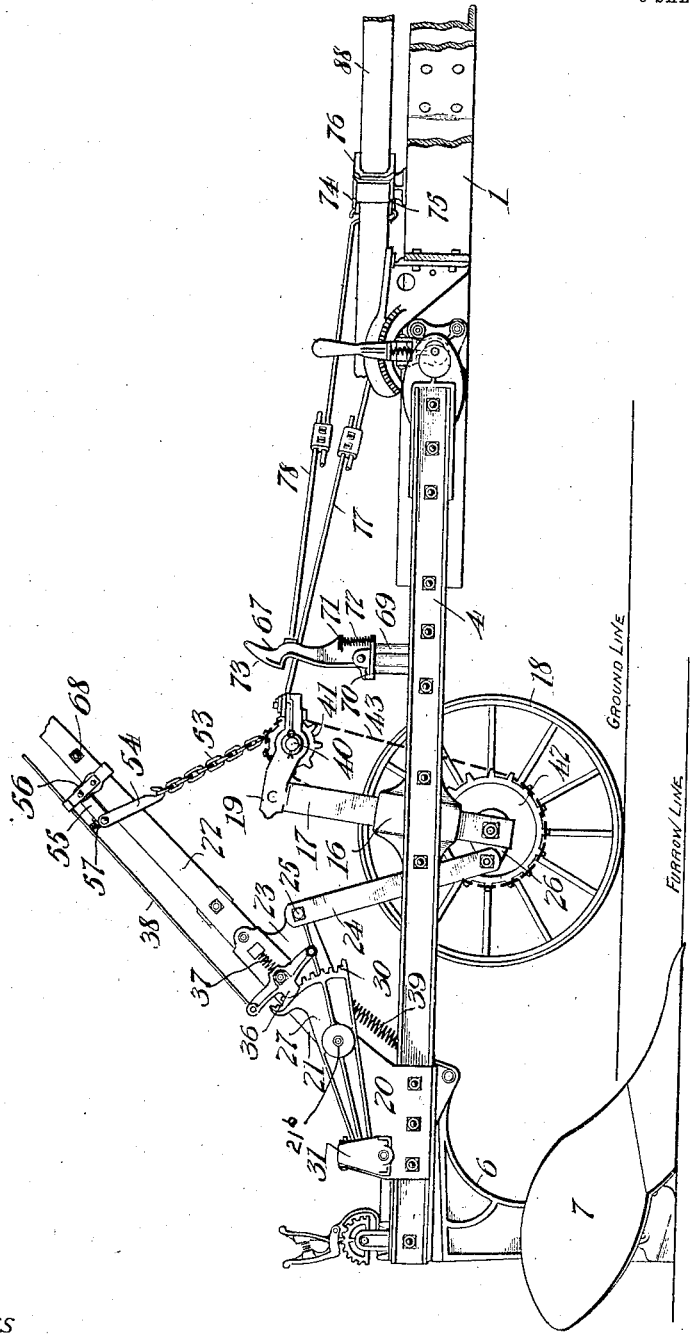

W. N. SPRINGER.
GANG PLOW.
APPLICATION FILED SEPT. 17, 1913.

1,101,348.

Patented June 23, 1914.
3 SHEETS—SHEET 1.

WITNESSES

INVENTOR
W. N. Springer
Attorney

W. N. SPRINGER.
GANG PLOW.
APPLICATION FILED SEPT. 17, 1913.
1,101,348.
Patented June 23, 1914.
3 SHEETS—SHEET 2.
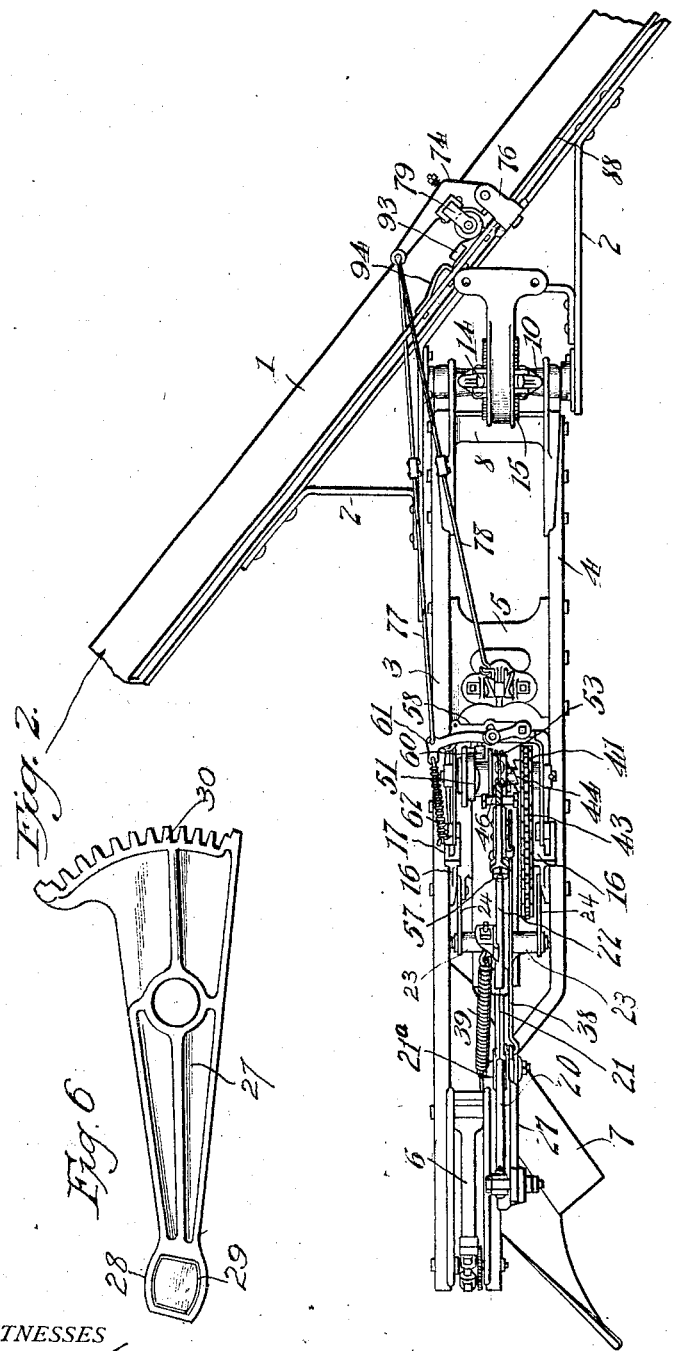
WITNESSES
INVENTOR
W. N. Springer
By H. A. Seymour
Attorney

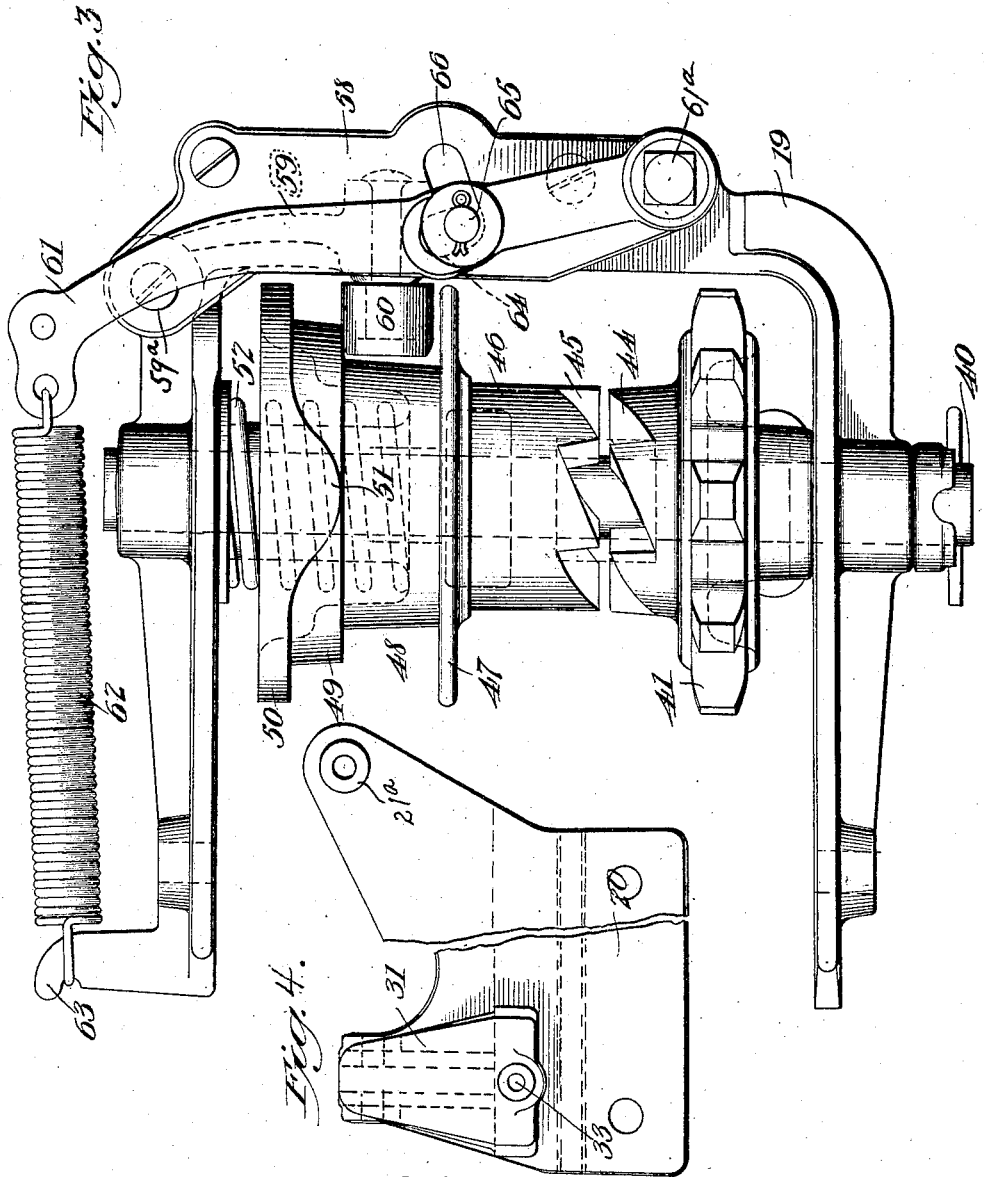

UNITED STATES PATENT OFFICE.

WILLIAM N. SPRINGER, OF SOUTH BEND, INDIANA, ASSIGNOR TO OLIVER CHILLED PLOW WORKS, OF SOUTH BEND, INDIANA.

GANG-PLOW.

1,101,348. Specification of Letters Patent. Patented June 23, 1914.

Application filed September 17, 1913. Serial No. 790,340.

*To all whom it may concern:*

Be it known that I, WILLIAM N. SPRINGER, of South Bend, in the county of St. Joseph and State of Indiana, have invented certain new and useful Improvements in Gang-Plows; and I do hereby declare the following to be a full, clear, and exact description of the invention, such as will enable others skilled in the art to which it appertains to make and use the same.

This invention relates to improvements in engine gang plows and more particularly to mechanism for raising and lowering the plow units,—the object of my invention being to provide simple and efficient manually operable means whereby the accurate operation of the raising means and their release to permit the lowering of the plow units, may be insured.

A further object is to so construct raising and lowering mechanism for the plow units of a gang plow, that each plow unit may have such mechanism carried thereby, and so that the manually operable controlling means for the mechanisms on the several plow units, may be mounted upon the truck frame and operatively connected with the raising and lowering mechanisms in such manner as to effect the operation of the same.

With these and other objects in view, the invention consists in certain novel features of construction and combinations of parts as hereinafter set forth and pointed out in the claims.

In the accompanying drawings; Figure 1 is a side elevation of a portion of a plow structure embodying my improvements; Fig. 2 is a plan view of the same; Fig. 3 is an enlarged plan view showing the clutch devices for raising mechanism; Figs. 4 and 5 are detail views showing the latch devices for the arm 27; and Fig. 6 is an enlarged detail view of the arm 27 and segment 30.

1 represents the diagonal rear beam of the truck frame of an engine gang plow and to this beam, brackets 2 are secured, the number of such brackets corresponding to the number of plow units to be employed. In the drawing, a single plow unit is shown, but it will be understood that a plurality of such units will be comprised in the plow structure. As all of said plow units and the operating mechanism for the same, are duplicates of each other, a detail description of one will suffice for all.

Each plow unit comprises two members 3—4 spaced apart and held rigid with respect to each other by means of a transverse bracket or spacer 5 located intermediate of the ends of said beam members and securely bolted to the latter. The beam member 3 is straight from end to end, while the rear portion of the beam member 4 is bent toward the beam member 3 and lies parallel with the latter, so that the rear portions of the beam members will be properly spaced apart to receive the upper portion of a plow standard 6 and connecting means therefor, said plow standard being secured at its lower end to the soil-engaging member 7. The forward ends of the beam members 3—4 are connected by a bracket 8, and the latter is provided with forwardly projecting arms 9 provided with bosses 10 having pivotal connection with the brackets 2.

At points in rear of the bracket or spreader 5 and in advance of the bent rear portion of the beam member 4, guide brackets 16 are securely bolted to the inner faces of the respective beam members and the guideways of these brackets are slightly inclined forwardly to receive forwardly inclined standards 17. The lower ends of the standards 17 are connected by the axle of a gage or lifting wheel 18, and the upper ends of said standards are connected by a frame or bracket 19, which projects forwardly from the same.

Securely bolted to the beam member 4 near the rear end of the latter and projecting above the same, is a bracket 20 provided at its upper forward end with laterally projecting bosses 21$^a$, to receive bosses 21$^b$ on the two members of a triangular arm 21 and form pivotal supports for the latter. The two sections of the arm 21 embrace the lower end of a lifting lever 22, which is secured thereto,—said arm 21 thus constituting means whereby the lifting lever is pivotally connected with the bracket 20. The depending portions of the sections of the triangular arm are provided with laterally projecting hubs or bosses 23, to which the upper ends of lifting bars 24 are pivotally connected by means of a bolt 25,—the lower ends of said lifting bars being pivotally connected with arms 26 secured to the lower ends of the standards adjacent to the axle of the gage or lifting wheel 18. It is apparent that if the lever 22 be moved downwardly, the rear ends of the beam and the soil-engaging member will be raised, the guides 16 on the beam members moving upwardly on the standards 17, and that when said lever is raised, the plow beam and soil-engaging member will be lowered.

An arm 27 is pivotally mounted between its ends, upon the boss 21$^b$ of one of the sections of the arm 21, and in this manner, said arm 27 is supported by the bracket 20, with its pivotal support in line with that of the lever 22. One end of the arm 27 is made with a head 28 having a recess 29 in one face, and the other end of said arm is made with a toothed segment 30. The head 28 at the smaller end of the segment arm 27 enters a slotted enlargement 31 at the rear end of the bracket 20, and is normally held in said enlargement by means of a latch 32,—the latter being pivotally supported on the bracket 20 at its upper end and adapted to enter the recess 29 in the head 28 of said latch arm. The lower portion of the enlargement 31 is made with a transverse hole 33 for the passage of a bolt 34 attached to the lower end of the latch, and a portion of the hole 33 is enlarged for the reception of a spring 35 which bears at one end against a suitable nut on the free end of the bolt 34 and thus serves to yieldably hold the latch in place when the head 28 of the segment arm is engaged thereby.

A latch 36 is pivoted at one end to the triangular arm 21 and provided with a suitable tooth which is pressed into engagement with the segment 30, by means of a spring 37, and to the free end of the latch, an operating rod 38 is attached.

A spring 39 may be attached at one end to the lifting lever 22 and at the other end to the plow standard or to the rear portion of the beam, to assist in the operation of raising the plow when the lifting lever 22 is depressed. The frame 19 secured to the upper ends of the standards 17, is provided with bearings for a shaft 40, to which a sprocket wheel 41 is secured. A larger sprocket wheel 42 is secured to the hub of the gage or lifting wheel 18 and transmits motion, through the medium of a sprocket chain 43, to the sprocket wheel 41 on the shaft 40. The sprocket 41 is provided with clutch teeth 44 to coöperate with clutch teeth 45 on one end of a drum or hub 46 mounted loosely on the shaft 40. The drum or hub 46, which constitutes the movable member of the clutch, is provided at one end with an annular flange 47, which also forms one flange for a sleeve 48 movable with the drum 46. The sleeve 48 is made with an annular enlargement 49, and at one side of the latter, an annular flange 50 is formed and provided with a cam 51 projecting laterally over the peripheral portion of the annular enlargement 49. The sleeve 48 is recessed for the accommodation of a spring 52, one end of which is seated in said recess and the other end of which bears against the frame 19, said spring tending to force the sleeve and the clutch member carried thereby, into operative relation to the clutch member on the sprocket 41.

A chain 53 is attached at one end to the drum 46 and adapted to wind upon the latter, the other end of said chain being connected with the lifting lever 22, through the medium of a hook 54. The hook 54 is bifurcated so as to embrace the lever 22 and the upper ends of the two arms of the hook are pivotally attached to a link 55, one end of which latter is pivotally attached to an arm 56 secured to the lever 22. An adjusting screw 57 passes through the link 55 (preferably near the free end of the latter) and engages the lever 22, whereby the link 55 may be adjusted to adjust the connection of the chain 53 with said lever.

A plate 58 is secured over the forward end of the frame or bracket 19, and at one end of this plate, one end of an arm 59 is pivotally supported at 59$^a$ and disposed under said plate. Near its free end, the arm 59 carries a roller 60 to coöperate with the annular enlargement 49 and cam 51 of sleeve 48, as hereinafter explained. At the other end of the plate 58, one end of a lever 61 is pivotally attached at 61$^a$, the other end of said lever projecting laterally beyond the opposite side of the frame 19 and connected with the rear end of the latter through the medium of a spring 62,—the rear end of the frame 19 being provided with a hooked arm 63 to receive said spring. The lever 61 is provided between its ends with an elongated slot 64 for the accommodation of a pin 65 secured to the pivoted arm 59, said pin also passing through an elongated slot 66 (approximately at right angles to the slot 64 in the sleeve 61) in the plate 58.

When the parts are in the positions shown in Fig. 3, the roller 60 is in engagement with the side face of the annular enlargement 49 and is holding the clutch members separated. Should the lever 61 be moved forwardly, the pivoted arm 59 with which said lever is connected, would also be moved forwardly and the roller 60 moved out of engagement with the side of enlargement 49, such movement of the pivoted arm and roller being guided and limited by the movements of the pin 65 in the elongated slots 64 and 66. When the roller 60 shall have been moved as above described, the sleeve 48 will be free to be slid on the shaft 40 by the action of the spring 52 for engaging the clutch teeth 45 with the clutch teeth 44. In other words,—the spring 52 will be free to act in moving the sleeve 48 to close the clutch. Motion will now be imparted to the drum 46 to wind the chain 22 thereon for effecting the lowering of the lifting lever 22 and the consequent raising of the plow beam and soil-engaging member, which operations will continue until the roller 60 is engaged by the cam 51 to disengage the clutch teeth. During these operations the lever 22 will be locked to the segment arm 27 and the latter will be released from the spring pressed latch 32 in the slotted enlargment 31, and move with said lever. When the parts are permitted to again assume their normal positions, with the plow lowered, the segment arm 27 will be locked automatically by the operation of the latch 32.

When the lifting lever 22 shall have been depressed to raise the plow as hereinbefore described by the application of power from the wheel 18, it will be held in such position by the engagement of a hook 67 with a bolt 68 on the lever 22. The hook 67 is pivotally mounted upon a pedestal 69 located on the spreader 5 and is limited in one direction by a foot 70. A lug 71 projects forwardly from the hook and between this lug and a support on the pedestal, a spring 72 is disposed to retain the hook in and return it to its normal position. The hook 67 is bifurcated to embrace the lever 22 when the latter is lowered, and the members of said hook are provided at their upper ends with beveled or cam projections 73 to engage the bolt 68 on the lever and cause the hook to snap over the same.

As hereinbefore stated, each plow unit is provided with the lifting devices such as above described in detail, and devices may be provided for causing the mechanisms on the several plow units to be operated to effect the raising of the plows or to drop them. Thus, two levers 74—75 may be pivotally supported at or near one end by a bracket 76 secured upon the beam 1 of the truck frame. The lever 75 is connected by means of an adjustable rod 77 with the free end of the clutch lever 61, and the lever 74 is connected by means of an adjustable rod 78 with the hook 67.

A bar 88 may be mounted to slide through the brackets 76 on the truck frame and this bar may be provided with cam blocks 93, 94, for operating the levers 74 and 75 to pull the rods 78 and 77 for controlling the operation of the raising and lowering mechanism.

Let it be assumed that all the plows are in working position, with the mechanism of each plow unit disposed as shown in Figs. 1 and 2, and that it is desired to raise the plows. The operator will move the slide bar longitudinally and cause the cam block 94 to actuate the lever 75, thus causing the latter to be turned on its fulcrum and impart motion through rod 77 to the clutch lever 61 of a plow unit,—the movement of said clutch lever acting to release the movable clutch member and permit the teeth 45 to engage the clutch teeth 44 on sprocket wheel 41. The chain 53 will be wound upon the drum 46 by power from the wheel 18, as hereinbefore explained, and the lever 22 will be lowered to raise the plow. When the plow shall have been thus raised, the lever 22 will be retained in its lowered position by the hooks 67, and the clutch will be automatically opened as previously explained.

When it is desired to release the levers 22 to permit the plows to drop to working positions, the operator will move the slide bar 88 in the reverse direction, whereupon the cams 93 will operate the levers 74, and thus cause motion to be imparted through the rods 78 to the hooks 67 to withdraw the same from engagement with the levers 22, permitting the latter to rise and the plows to drop to working position.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination of a gang frame, a gang unit pivotally connected at its forward end with said frame, a ground wheel, a lever, a drum carried by said unit, a flexible element connecting said drum and said lever, and a clutch between said ground wheel and said drum.

2. In a plow, the combination with a frame and a plow having its beam connected at its forward end therewith, a standard having movable connection with said beam, a wheel having mountings at the lower portion of said standard, a lifting lever pivotally mounted upon the beam, connections between said lever and the standard, a frame on said standard, a shaft mounted on said frame, a drum on said shaft, a flexible device secured on said drum and connected with the lifting lever, gearing between said wheel and shaft, and clutch devices for connecting said gearing with the drum and disconnecting it therefrom.

3. In a plow, the combination with a frame and a plow having its beam connected at its forward end with said frame, of a standard having movable connection with the beam, a wheel having mountings in said standard, a lifting lever, connections between the lifting lever and said standard, a frame on the standard, a shaft mounted on said frame, a drum on said shaft, a flexible device secured on said drum, a hook connected with said flexible device, means adjustably connecting said hook with the lifting lever, gearing connecting said shaft and wheel, and a clutch for connecting said gearing with and disconnecting the same from said drum.

4. In a plow, the combination with a frame and a plow having its beam connected at its forward end therewith, of a standard movably connected with the beam, a wheel having mountings in said standard, a lifting lever, connections between said lifting lever and the standard, a shaft supported by said standard, a drum on said shaft, gearing between said shaft and wheel clutch devices for connecting said gearing with the drum, a flexible device secured on said drum, a link adjustably connected with the lifting lever, and a hook pivotally connected with said link and attached to the flexible device.

5. In a plow, the combination with a frame, and a plow having the forward end of its beam connected with said frame, of lifting mechanism mounted on the plow beam, said lifting mechanism including a lifting lever, a hook mounted on the beam, a device on the lifting lever to be engaged by said hook, and operating means mounted on the frame and connected with said hook.

6. In a plow, the combination with a frame, and a plow having its beam connected with said frame, of lifting mechanism carried by said beam, said lifting mechanism including a lifting lever, a yielding hook pivotally mounted on the beam and having a beveled upper end, a device on the lifting lever to be engaged by said hook, operating devices on the frame, and a connection between said operating devices and hook.

7. In a plow, the combination with a frame and a plow having its beam connected at its forward end with said frame, of a lifting wheel, a standard connected with the axle of said lifting wheel and movably connected with the beam, a bracket secured to the beam, an arm pivoted to said bracket, connections between said arm and the standard, a lifting lever secured to said pivoted arm, a segment arm pivoted to the bracket, a latch on the bracket to engage one end of said segment arm, a detent on the pivoted arm of the lifting lever to engage the other end of the segment, a drum mounted on the standard, a flexible connection between said drum and the lifting lever and gearing for connecting said drum with the lifting wheel.

8. In a plow, the combination with a truck frame and a plow unit connected at its forward end therewith, of a standard having movable connection with said plow unit, a lifting wheel mounted in said standard, a lifting lever on the plow unit, connections between said lifting lever and said standard, a shaft mounted on the standard of the plow unit, a drum loose on said shaft, a flexible device wound on said drum and connected with the adjacent lifting lever, clutch teeth on said drum, a sprocket on said shaft and provided with clutch teeth to receive the clutch teeth on the drum, controlling means for said drum, devices on the truck frame for operating said controlling means, a sprocket on the lifting wheel, and a chain connecting the sprocket on the lifting wheel with the sprocket on the shaft.

9. In a gang plow, the combination with a truck frame and a plow unit connected at its forward end therewith, of raising devices carried by said plow unit and including a raising lever, a shaft, a drum loose on the shaft and provided with a clutch member, a sprocket on the shaft provided with a clutch member, a spring for moving the drum to engage said clutch members, controlling means for said drum, operating means on the truck frame for actuating said controlling means, means movable with the drum and coöperative with said controlling means to constitute stop mechanism for the drum, and a flexible device connecting the drum with the raising levers.

In testimony whereof, I have signed this specification in the presence of two subscribing witnesses.

WILLIAM N. SPRINGER.

Witnesses:
   Edwin Nicar,
   Kate E. Buckley.